Jan. 16, 1951     D. P. ALLEN     2,538,406
METHOD OF MAKING DOOR SEALING STRIPPINGS
CONTAINING SPONGE RUBBER

Filed May 15, 1948     3 Sheets-Sheet 1

INVENTOR.
DWIGHT P. ALLEN
BY
Clarence B. Des Jardins
HIS ATTORNEY

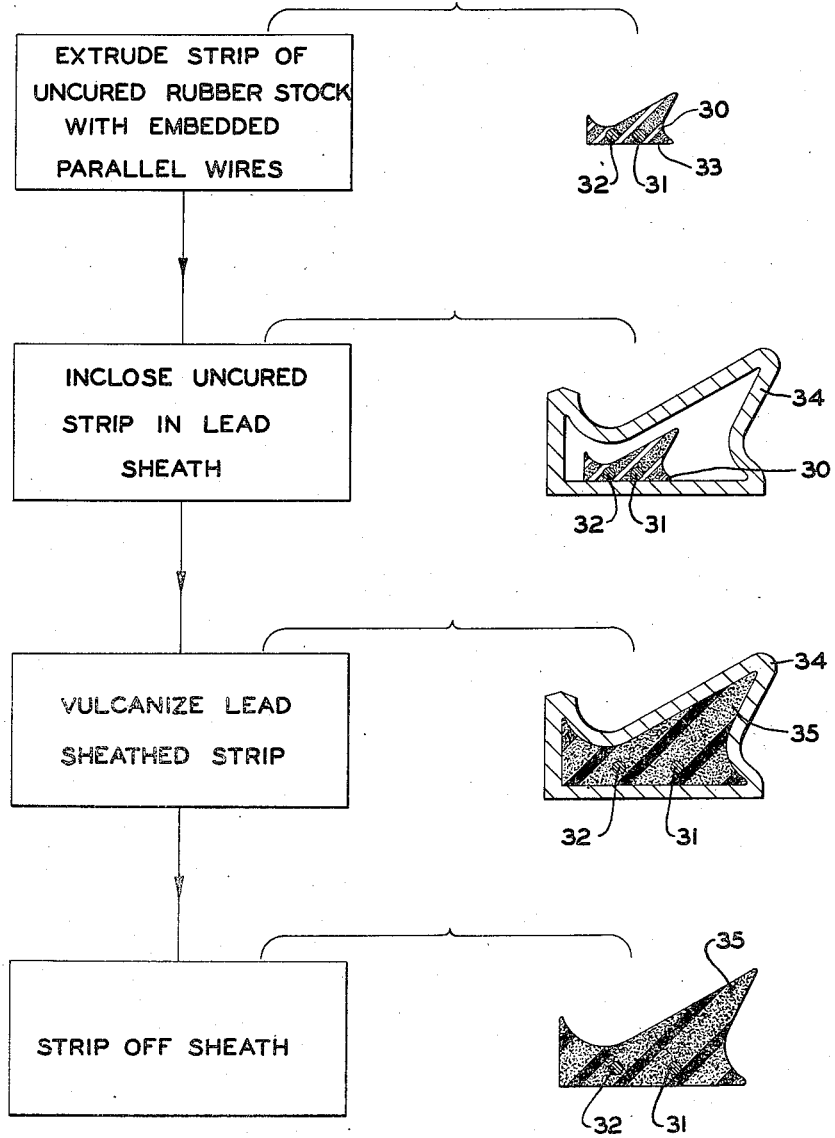

Patented Jan. 16, 1951

2,538,406

UNITED STATES PATENT OFFICE 2,538,406

METHOD OF MAKING DOOR SEALING STRIPPINGS CONTAINING SPONGE RUBBER

Dwight P. Allen, Detroit, Mich., assignor to Allen, Anderson & Company, Wayne County, Mich., a corporation of Michigan Application May 15, 1948, Serial No. 27,168

3 Claims. (Cl. 18—53)

This invention relates to a method of making door sealing stripping containing sponge rubber, and more particularly pertains to a continuous type of process.

In making such stripping it is desirable to produce continuous long lengths in order to make the most efficient use of the manufacturing facilities and to permit the cutting off of the exact desired lengths.

Such door sealing stripping is used extensively in the weatherproofing of automobile doors, either by applying cut lengths of such strippings to the door jambs or to the doors themselves. In making such stripping it is necessary to keep the cross sectional dimensions accurate and this is difficult in a continuous process as the air or gas inclusions in the sponge stock, generated by the vulcanizing temperature will distort the stripping in an unpredictable manner unless confined in a mold. The making of permanent confining molds for the vulcanizing process is impossible when continuous lengths are to be made.

I have devised a method of making stripping, of sponge rubber, sponge rubber-like material, or other sponge elastomer which is vulcanizable, in long lengths, by continuously extruding the uncured stock and confining it with a lead sheath, and then vulcanizing the sheathed stripping, the lead acting as a continuous mold to determine the cross sectional shape and dimension of it. Both the extrusion of the unvulcanized stripping and its sheathing with lead may be done in a continuous operation, and very long lengths of the sheathed stripping may be vulcanized by rolling such lengths on spools, or drums, and introducing such spools, or drums, into a vulcanizing chamber which will, in one vulcanizing period, accommodate a very large amount of such stripping.

These steps of the process are set forth diagrammatically in the drawings in which.

Fig. 3 shows the steps for producing sponge rubber door sealing stripping having a pair of parallel wires running longitudinally therein to support the heads of spring clips for fastening such stripping to an automobile body, such stripping and its use being fully set forth in my copending application for United States Letters Patent Serial No. 1870, filed on the 12th day of January, 1948 now abandoned.

Figure 1:
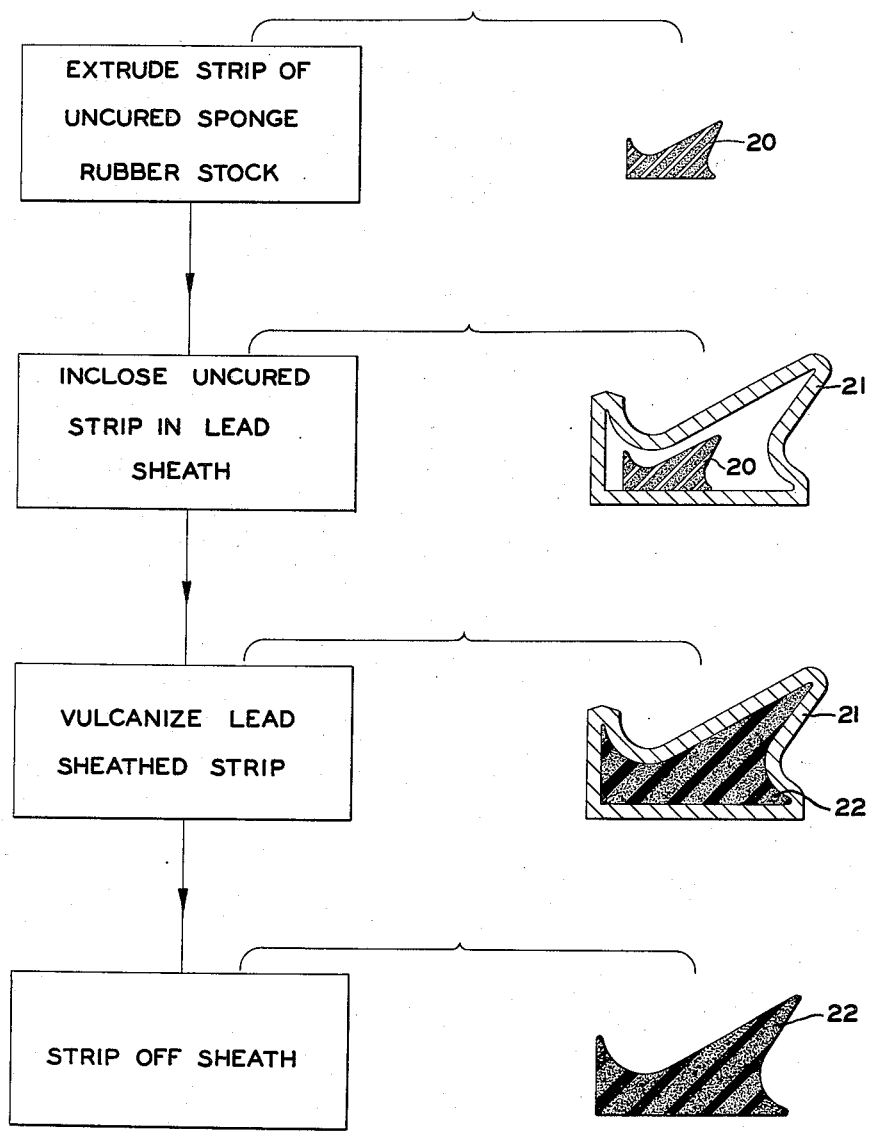
Fig. 1 shows the steps for producing door sealing stripping made exclusively of sponge rubber.

I have shown stripping of the same typical cross section, for use in weatherproofing automobile doors, in all of the drawings, but such section is not a limiting factor. Referring, first, to Fig. 1, in making stripping composed entirely of sponge rubber, the first step is to extrude uncured sponge rubber stock 20 in a long strip, preferably of a cross sectional dimension like the finished product but about forty percent of the cross sectional area of the finished strip. Next, the extruded strip is confined in a continuous loose lead sheath 21 which should be of sufficient thickness and so shaped interiorly as to size and contour as to form the final shape of the strip 20 as it is expanding under vulcanizing temperature. This lead sheath may be applied by a lead press or other type of lead sheather, in a continuous manner, such as by carrying the sponge rubber extrusion through a T-headed extrusion machine which extrudes lead loosely around the stripping as it passes therethrough. Such a lead press should be equipped with a mandrel to shape the inside of the extruded sheath to the desired contour. A typical type of such sheathing machine is shown in United States Patent No. 1,993,384. Desired lengths can be cut from the lead sheathed extrusion, from time to time, and wound on drums or spools such as are commonly used for the storing of lead sheathed cables. The severed ends of such lengths of stripping that are wound on the drums or spools must be pinched or covered with lead to provide a proper over-all encasement.

The lead sheathed lengths of unvulcanized stripping, wound on the supporting drums or spools, or supported in any other fashion, are then put into vulcanizing chambers in which they may be heated to a vulcanizing temperature for the necessary period. The drums, or spools, each of which may contain hundreds of feet of the sheathed stripping, then may be subjected to the vulcanizing temperatures, in a single vulcanizing operation during which time the expanding agents in the sponge stock cause the strip to expand to fill the sheath. The vulcanized stripping 22 is released from the sheath by a stripping or peeling step carried out by making cuts on each side of the lead sheathing, longitudinally thereof, then peeling off the resultant lead strips which form scrap which may be used again.

It is within the principle of the invention to cure the sheathed stripping in a continuous process by simply passing it through a long vulcanizing compartment.

In another form of the invention, shown in

Figure 2:
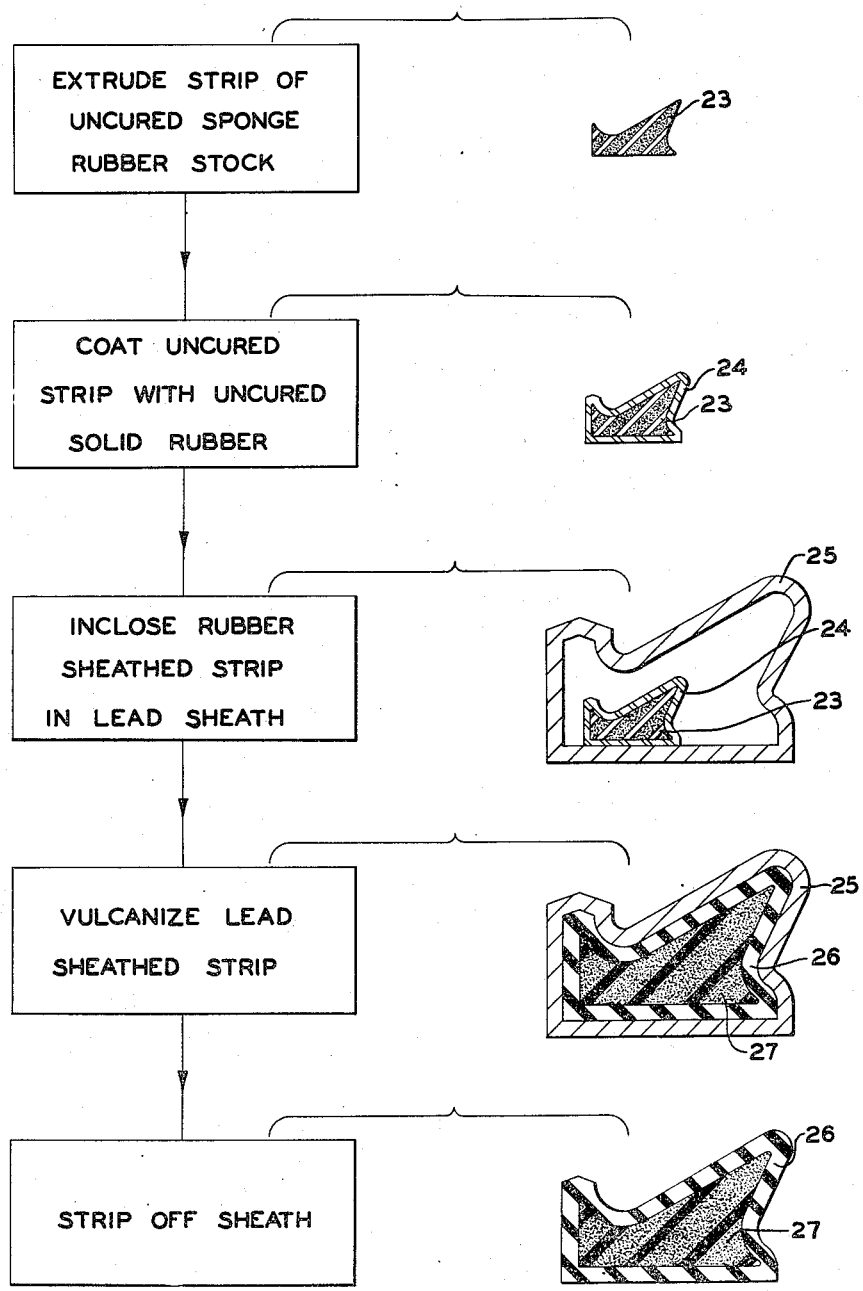
Fig. 2 shows the steps for producing sponge rubber door sealing stripping having a solid rubber sheath thereabout.

Fig. 2, the extruded unvulcanized sponge rubber stripping 23 is first coated with unvulcanized solid rubber, forming a sheathing 24, before it has the lead sheathing 25 applied thereto. The uncured solid rubber sheathing can be applied to the extruded uncured sponge rubber strip by the same sort of T-head extrusion press described in connection with the application of the lead sheathing. From that point on the steps are the same as those described in the first form of the invention in connection with Fig. 1, the lead sheathed sponge and solid rubber stripping being heated to produce the expanded vulcanized sponge rubber core 27 coated with the vulcanized solid rubber coating 26. The lead sheath is then peeled from the vulcanized product as described in the first form of the invention.

In Fig. 3, I show the process of Fig. 1 except that the sponge rubber extrusion 30 has, at the time of extrusion, embedded therein wires 31 and 32, running parallel with the length of the strip, and parallel with a flat surface 33 of the strip, said wires acting as load bearing and transfer members. Such a construction is shown in my copending application, as aforesaid, the wires being available to retain the heads of spring clips in the rubber without subjecting the rubber to tearing forces, except as distributed over the length of the strip through the medium of said wires. In this process the lead sheath 34 is applied, and the sheathed stripping is heated to form the expanded vulcanized sponge core 35 which is released from the lead sheath 34 by the peeling step, before described.

It is also within the scope of the invention to have the finished stripping of Fig. 3 sheathed with a solid rubber coating as shown in Fig. 2, the extra step of the process being obvious.

In speaking of rubber or rubber-like material, I include vulcanizable elastomeric material in general, such as the synthetic rubbers typified by butadiene-acrylonitrile copolymer material.

It will be understood that the common principle of the invention running through the three processes, shown, is the use of a lead sheath which acts as a temporary continuous mold to confine the stripping during the vulcanizing step, so the form of the stripping will not be distorted by the expanding forces of the gas generated by the heat.

Although lead has been specified for the sheathing I include specifically lead alloys having a comparable melting point and rigidity permitting them to undergo vulcanizing temperatures without loss of strength. I also include other low melting point metals or metal alloys which do not contain lead, it being obvious that the physical properties of melting point, strength in the solid state, extrudability, and flexibility are the important characteristics for this sheathing purpose.

I am aware that the process described herein is susceptible of considerable variation without departing from the spirit of my invention and, therefore, I claim my invention broadly as indicated by the appended claims.

Having thus described my invention, what I claim as new and useful and desire to secure by United States Letters Patent, is:

1. The process of making vulcanized sponge rubber door sealing strip comprising the steps of continuously extruding a lead mold having a mold cavity of the cross-sectional form and dimensions of the finished strip to be produced; continuously forming an extrusion of sponge rubber compound, of substantially smaller cross-sectional dimensions than the mold cavity of said lead mold, and feeding said extrusion into said mold cavity; heating said mold and the extrusion loosely contained therein to expand said extrusion and cause the formation therefrom of a sponge rubber strip filling said mold cavity and to vulcanize said sponge rubber strip so formed; and finally stripping the lead mold from the finished strip.

2. The process of claim 1 in which said extrusion is formed with an external layer of unvulcanized solid rubber compound.

3. The process of claim 1 in which said extrusion is formed with a pair of parallel wires running longitudinally thereof.

DWIGHT P. ALLEN.

REFERENCES CITED

The following references are of record in the file of this patent:

UNITED STATES PATENTS

| Number | Name | Date |
| --- | --- | --- |
| 288,795 | Hamon | Nov. 20, 1883 |
| 802,159 | Dykes | Oct. 17, 1905 |
| 1,237,554 | Price | Aug. 21, 1917 |
| 1,689,205 | Lamplough | Oct. 30, 1928 |
| 1,812,686 | Crowdes | June 30, 1931 |
| 2,226,768 | Harrison | Dec. 31, 1940 |
| 2,421,625 | Kretschmer | June 3, 1947 |